United States Patent
Hänninen et al.

(10) Patent No.: US 9,327,940 B2
(45) Date of Patent: May 3, 2016

(54) ELEVATOR SYSTEM PROVIDING AN ENERGY SAVING MODE

(71) Applicant: KONE CORPORATION, Helsinki (FI)

(72) Inventors: Ari Hänninen, Hyvinkää (FI); Tapio Tyni, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 547 days.

(21) Appl. No.: 13/789,171

(22) Filed: Mar. 7, 2013

(65) Prior Publication Data

US 2013/0175121 A1  Jul. 11, 2013

Related U.S. Application Data

(63) Continuation of application No. PCT/FI2011/000038, filed on Aug. 25, 2011.

(30) Foreign Application Priority Data

Sep. 7, 2010  (FI) .................................... 20105931

(51) Int. Cl.
B66B 1/16 (2006.01)
B66B 1/34 (2006.01)
B66B 1/24 (2006.01)

(52) U.S. Cl.
CPC ................ B66B 1/34 (2013.01); B66B 1/2491 (2013.01); B66B 2201/241 (2013.01)

(58) Field of Classification Search
CPC .. B66B 1/34; B66B 1/2491; B66B 2201/241; Y02B 50/122; Y02B 50/127
USPC ........................ 187/247, 380–388, 391, 393
See application file for complete search history.

(56) References Cited

U.S. PATENT DOCUMENTS

| | | | | |
|---|---|---|---|---|
| 3,110,879 A | * | 11/1963 | Nikazy | B66B 3/02 187/398 |
| 5,020,642 A | * | 6/1991 | Tsuji | B66B 1/18 187/382 |
| 6,202,799 B1 | | 3/2001 | Drop | |
| 6,481,535 B1 | * | 11/2002 | Fargo | B66B 1/18 187/251 |
| 6,868,945 B2 | * | 3/2005 | Schuster | B66B 1/468 187/380 |
| 7,711,565 B1 | * | 5/2010 | Gazdzinski | B66B 3/00 187/396 |
| 7,866,446 B2 | * | 1/2011 | Lindegger | B66B 1/2408 187/316 |
| 8,528,701 B2 | * | 9/2013 | Schwarzentruber | B66B 1/468 187/384 |
| 9,079,752 B2 | * | 7/2015 | Takeshima | B66B 1/2458 |
| 2005/0051620 A1 | * | 3/2005 | DiLuoffo | G07F 7/08 235/382 |

(Continued)

FOREIGN PATENT DOCUMENTS

CN  101407293 A  4/2009
CN  101792080 A  8/2010

(Continued)

Primary Examiner — Anthony Salata
(74) Attorney, Agent, or Firm — Birch, Stewart, Kolasch & Birch, LLP

(57) ABSTRACT

An elevator system includes a control for controlling an elevator into an idle state and/or for cancelling the idle state. The elevator system is configured to receive data from a control circuit external to the elevator system, and the control is arranged to form a control command for controlling the elevator into an idle state and/or for cancelling the idle state on the basis of data received from a control circuit external to the elevator system.

4 Claims, 2 Drawing Sheets

Legend
5: Camera
6a: RFID Reader
6b: RFID Identifier

(56) References Cited

U.S. PATENT DOCUMENTS

| | | |
|---|---|---|
| 2005/0173199 A1 | 8/2005 | Kawai |
| 2006/0231348 A1 | 10/2006 | Komatsu |
| 2007/0267254 A1 | 11/2007 | Bauge |
| 2007/0295566 A1 | 12/2007 | Lindegger |
| 2011/0100762 A1* | 5/2011 | Gerstenkorn ........... B66B 1/468 187/384 |
| 2012/0153868 A1* | 6/2012 | Gu .................... H05B 37/0227 315/307 |
| 2012/0158203 A1* | 6/2012 | Feldstein .............. G06F 1/3231 700/295 |
| 2013/0186713 A1* | 7/2013 | Suzuki .................. B66B 1/2408 187/385 |

FOREIGN PATENT DOCUMENTS

| | | |
|---|---|---|
| JP | 2003-192243 A | 7/2003 |
| JP | 2008-254850 A | 10/2008 |
| JP | 2009-274801 A | 11/2009 |
| WO | 2009/068724 A1 | 6/2009 |

* cited by examiner

ELEVATOR SYSTEM PROVIDING AN ENERGY SAVING MODE

CROSS-REFERENCE TO RELATED APPLICATIONS

This application is a Continuation of PCT International Application No. PCT/FI2011/000038 filed on Aug. 25, 2011, which claims the benefit to Patent Application No. 20105931 filed in Finland on Sep. 7, 2010. The entire contents of all of the above applications are hereby expressly incorporated by reference.

FIELD OF THE INVENTION

The invention relates to a control for the idle state of an elevator system, more particularly to solutions for controlling an elevator into an idle state and/or for cancelling the idle state in an elevator system.

BACKGROUND OF THE INVENTION

In an elevator system one or more elevators can be switched from normal operation to an idle state during the periods of time when the elevators are not used or their use is minimal. The electricity consumption of the elevator system can be reduced by disconnecting the electricity supply of one or more control devices of the elevator during an idle state of the elevator. This type of energy-saving mode of an elevator is useful because e.g. in a fairly low apartment block often over one-half of the energy consumption of an elevator system occurs during periods of time when the elevator is not used. Sometimes an elevator/some elevators is/are parked at a certain predefined floor for the duration of an idle state.

A problem of the aforementioned solutions is the start-up delays which are caused when returning elevators from an idle state back to normal operation. The restarting of the electricity supply of the control devices of an elevator causes a delay, which might lengthen the waiting time of the elevator. Also the transfer of an elevator car from the parking floor during an idle state to a passenger awaiting an elevator might slow down the service.

SUMMARY OF THE INVENTION

The aim of the invention is therefore to optimize the waiting time of an elevator in connection with the switching of the elevator to an idle state/recovery of the elevator from an idle state.

The first aspect of the invention relates to an elevator system, which comprises a control for controlling an elevator into an idle state and/or for cancelling the idle state. The elevator system is configured to receive data from a control circuit external to the elevator system, and the aforementioned control is arranged to form a control command for controlling the elevator into an idle state and/or for cancelling the idle state on the basis of the data received from the control circuit external to the elevator system. In one embodiment of the invention the elevator system is configured to receive a signal formed by a control circuit external to the elevator system, and the aforementioned control is arranged to form a control command for controlling the elevator into an idle state and/or for cancelling the idle state on the basis of signal formed by the control circuit external to the elevator system. The aforementioned control circuit external to the elevator system is preferably a control circuit of the building, said control circuit not belonging to the elevator system, such as e.g. a control circuit for the lighting of the building, a control circuit for the locking of the door and/or an access control circuit of the building. A control circuit external to the elevator system can be implemented with electronic and/or electrical control/operating elements, and it can comprise e.g. one or more microprocessors, control logics, IC circuits, relays, contactors, solid-state switches, memory circuits, et cetera. The term elevator system refers to a system intended more particularly for transporting passengers and/or freight, in which system the passengers and/or freight can be transported in an essentially vertical direction.

Thus the elevator can be woken up from an idle state e.g. from the control of the stairway lighting switches such that always when a lights is switched on some floor of the building the elevator is woken up. New buildings in particular also comprise movement detectors, which switch on the stairway lights. The waking of an elevator from an idle state can also be connected to this solution. The elevator can also be switched from normal operation to an idle state e.g. when the stairway lights extinguish or with a certain delay after the lights have extinguished. In this way the operating need for the elevator can be forecast better, because the extinguishing of the lights in a building gives a reliable indication of a reduction in the operating need for the elevator. By means of the solution energy can also be saved by switching the elevator into an energy-saving mode during an idle state of the elevator while there is little elevator traffic. On the other hand, the system can be connected e.g. to the data of the door keycards of hotel rooms; with these types of door keycards often the lighting of a hotel room, in addition to the locking of the doors, is managed. In this case the waking of an elevator can be activated e.g. when a door keycard is taken out of a unit controlling the lights of a hotel room. In many buildings the locking of the outer doors as well as access control is controlled electronically. The data of this type of electronic control circuit connected to the access control can also be utilized in the control of the idle state of the elevator. The elevator can, for example, be woken up from an idle state using the information produced by an electronically controlled lock about an elevator passenger arriving in the building. Also the data produced by e.g. a doorbell, camera surveillance or other access control device can be used to wake up an elevator from an idle state. If the control circuit to be used enables the identification of a person, information about the possible destination floor of a person can be added to the user data of the person in respect of the elevator system. User data can be recorded also e.g. in the memory of the group control unit or elevator control unit, as well as in the memory of a control circuit external to the elevator system. In this case a destination call, which specifies the assumed destination floor of the passenger for the purpose of the control of the elevator, can also be formed in connection with waking up the elevator from an idle state. On the other hand, a destination call can also remain unformed and the elevator can also be left unwoken from an idle state if the identified person will not, according to the user data (e.g. if the person lives on the first floor, et cetera), use the elevator.

The second aspect of the invention relates to an elevator system, which comprises an elevator control unit for controlling the movement of an elevator car. The aforementioned elevator control unit is configured to receive data from the aforementioned control circuit external to the elevator system, and the aforementioned elevator control unit is arranged to start an elevator run sequence for cancelling the idle state of the elevator on the basis of data received from the control circuit external to the elevator system. When a control circuit, which is external to the elevator system, to be used enables the identification of a person, information about the possible destination floor of a person can be added to the user data of the person in respect of the elevator system. User data can be recorded also e.g. in the memory of the group control unit or elevator control unit instead of the memory of the control circuit external to the elevator system. In this case a destination call, which specifies the assumed destination floor of the passenger, can also be formed in connection with waking up the elevator from an idle state. In this case the elevator control unit can start a run sequence according to the destination call. In a preferred embodiment of the invention the elevator car is driven to a predefined point in the elevator hoistway during an idle state. In this case the elevator control unit can then start a run sequence for cancelling the idle state by transferring the elevator car from its location during an idle state to that entrance at which it is assumed, on the basis of the information received from a control circuit external to the elevator system, that the passenger will arrive.

The third aspect of the invention relates to an elevator system, into connection with which are fitted means for detecting an elevator passenger. The elevator system comprises a control for controlling the elevator into an idle state and/or for cancelling the idle state. The means for detecting an elevator passenger are fitted to detect an elevator passenger at a defined distance from the entrance of the elevator car, and the control is arranged to form a control command for controlling the elevator into an idle state and/or for cancelling the idle state on the basis of the performed detection of the elevator passenger at the predefined distance from the entrance of the elevator car. In a preferred embodiment of the invention the means for detecting an elevator passenger are consequently fitted to detect an elevator passenger before the arrival of the elevator passenger at the entrance of an elevator car, and the control is arranged to form a control command for cancelling the idle state of the elevator on the basis of the detection performed.

The aforementioned distance from the entrance of the elevator car is preferably determined such that at least the same amount of time is spent on the transfer of a passenger the aforementioned amount of distance at the estimated transfer speed as for the return of the elevator from an idle state to operational readiness. The time to be taken for the elevator to return from an idle state to operational readiness is preferably at least approx. 5 seconds and at most approx. 15 seconds. The transfer speed of a passenger can be estimated e.g. on the basis of an assumed walking speed or transfer speed depending on another method of moving. If an escalator or travelator is used for transferring to the entrance of an elevator car, the transfer speed of a passenger can be estimated on the basis of the transfer speed of the escalator/travelator.

In a preferred embodiment of the invention the means for detecting an elevator passenger are fitted to already detect an elevator passenger arriving at the building while said passenger is outside the building. The means for detecting an elevator passenger are preferably fitted in connection with the entrance of the building.

In one embodiment of the invention the means for detecting an elevator passenger comprise a part to be carried along with an elevator passenger as well as a fixed stationary part, and the aforementioned part to be carried along with an elevator passenger and the aforementioned fixed stationary part are configured to form a wireless data transfer connection with each other for detecting an elevator passenger. The data to be transferred between the aforementioned part to be carried along with an elevator passenger and the aforementioned fixed stationary part can in this case preferably be transmitted as electromagnetic radiation. The part to be carried along with an elevator passenger can also comprise identification for identifying the elevator passenger. This type of identifier that is carried along with a person and contains an identification is e.g. an RFID identifier, in which case the fixed stationary part comprises a reader circuit for an RFID identifier. An elevator passenger can also be identified on the basis of a signal of e.g. a mobile phone or pocket computer.

In a preferred embodiment of the invention the elevator is controlled into an energy-saving mode during an idle state, and the electricity supply of one or more devices of the elevator system is arranged to be disconnected for the duration of an energy-saving mode of the elevator, in which case the energy consumption of the elevator system can be reduced. In one embodiment of the invention the elevator car is driven to a predefined point in the elevator hoistway during an idle state of the elevator. One possibility is to drive the elevator car for the duration of an idle state to a point from which a person arriving in the building has the shortest connection to transfer to the elevator car. The elevator car can also be driven for the duration of an idle state to a point that is particularly favorable during exceptionally strong swaying of the building, such as e.g. during a strong wind or earthquake.

By means of the invention the operating need of an elevator can be forecast and at the same time the impact of delays caused in particular by switching an elevator from an idle state back to normal operation on the waiting times of the elevator can be optimized, preferably reduced.

The aforementioned summary, as well as the additional features and advantages of the invention presented below, will be better understood by the aid of the following description of some embodiments, said description not limiting the scope of application of the invention.

BRIEF EXPLANATION OF THE FIGURES

In the following, the invention will be described in more detail by the aid of some examples of its embodiments with reference to the attached figures, wherein.

MORE DETAILED DESCRIPTION OF PREFERRED EMBODIMENTS OF THE INVENTION

Embodiments 1, 2

Figure 1:
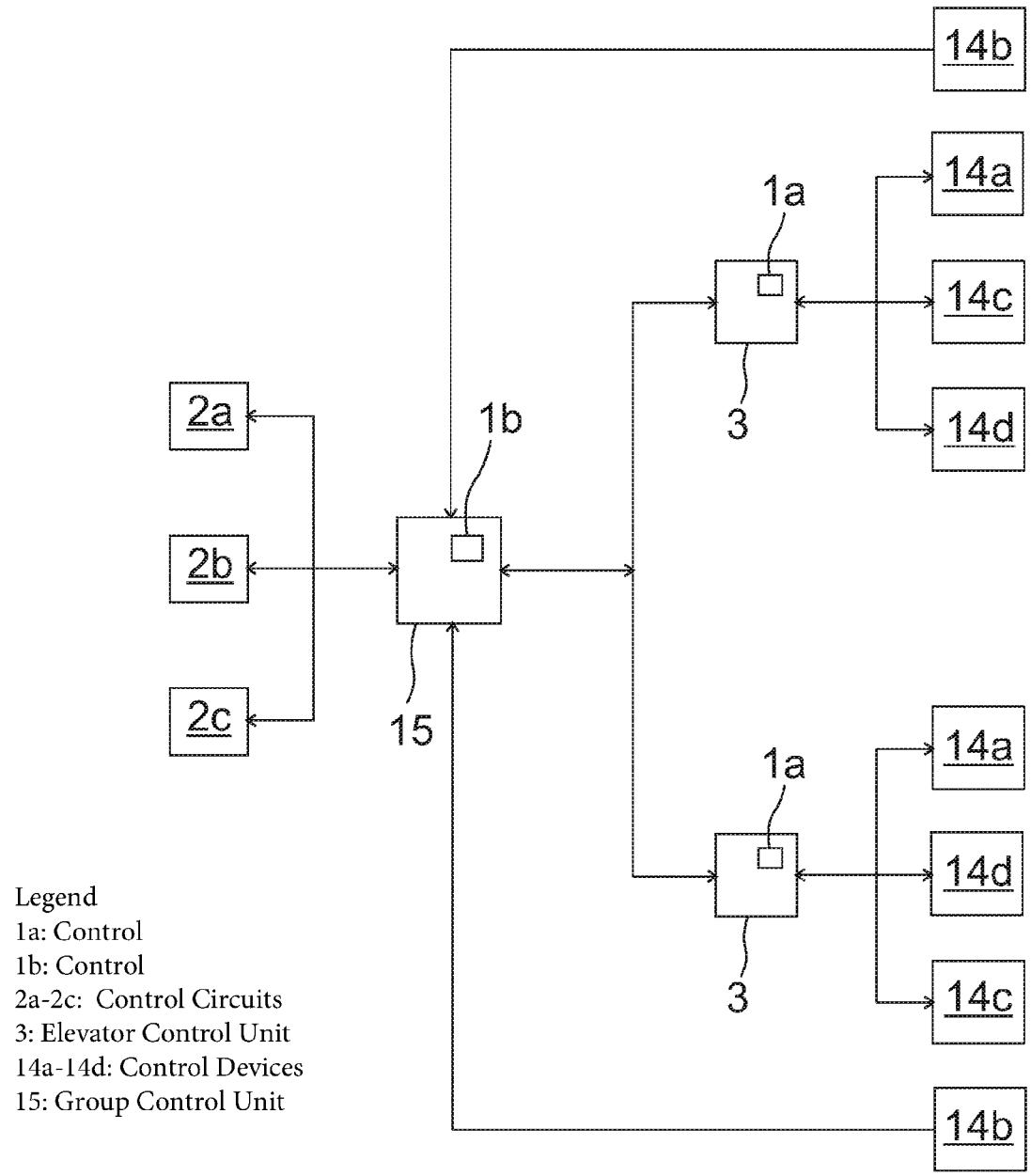
FIG. 1 presents as a block diagram a control apparatus of an elevator system in connection with a first and a second embodiment of the invention

FIG. 1 presents as a block diagram the control apparatus of an elevator system, which control apparatus is used in an elevator system comprising a number of elevators, which are configured to transfer passengers and/or freight along an essentially vertical path of movement. The mechanical and electromechanical basic elements needed for transferring passengers/freight, such as the elevator car, guide rails, suspension ropes of the elevator car, the hoisting machine with which the elevator car is moved in the elevator hoistway, et cetera, are in essence known to a person skilled in the art and their operation and structure are not separately presented here.

In the elevator system according to FIG. 1 each of the elevators comprises an elevator control unit 3, which manages the control of the movement of the elevator car by forming a speed reference, i.e. a target value for speed of the movement of the elevator car in the elevator hoistway. The elevator control unit 3 is connected to the control devices 14a, 14*b*, 14*c*, 14*d* of the elevator in a manner enabling data transfer, e.g. with a data bus, which can be a serial bus, a parallel bus or a combination of both. The elevator control unit 3 communicates a speed reference to the frequency converter 14*c*, with which speed reference the speed of the elevator car is adjusted towards the target value for speed, such that when the elevator car starts moving the speed of the elevator car at first gradually accelerates to the permitted maximum speed, and the elevator car is driven at the permitted maximum speed until the speed again starts to be decelerated such that the speed gradually decreases to zero when the elevator car arrives at the stopping floor. During this elevator run sequence speed control occurs by adjusting with the frequency converter the power to be supplied to the hoisting machine, in which case the speed of the elevator car can be steplessly controlled. The elevator car is moved in the elevator hoistway in response to elevator calls to be given with call-giving appliances 14*b*, which elevator calls can also be, in addition to ordinary car calls, destination calls, in which case an elevator call also includes information about the destination floor of an elevator passenger. The elevator car also normally comprises a user interface for giving destination calls; the other control devices 14*a* in/on the elevator car can be e.g. displays, control devices for the door operator of the elevator car, various positioning devices of the elevator car, the lighting of the elevator car and the electricity supply devices for lighting, et cetera.

In addition, the control apparatus normally comprises a safety circuit 14*d* of the elevator, which safety circuit is separate from the rest of the system and has the purpose of ensuring the operation of the elevator is safe not only in normal operation but also e.g. during installation and maintenance work of the elevator. The safety circuit of the elevator comprises e.g. sensors that measure the position and/or the locking of the landing doors of the elevator, sensors that are disposed in the proximity of the ends of the elevator hoistway and that define the limits of permitted movement of the elevator car, sensors measuring the operation of the brake of the hoisting machine, et cetera.

A number of elevators of an elevator system can also be operationally connected with a group control unit 15, which receives from call-giving appliances 14*b* the elevator calls of the different elevators and allocates a call to a certain elevator to be serviced, endeavoring to optimize the operation of the elevator system, e.g. to shorten the waiting time for an elevator, to reduce the energy consumption of an elevator, et cetera. A group control unit 15 is not, however, necessarily used, particularly in smaller elevator systems that often comprise only one elevator. In this case the elevator control unit 3 manages the receiving of calls and controls the movement of the elevator car in the manner required by the calls.

The software and/or control logic of the group control unit 15 comprises a control 1*b* for controlling one or more elevators into an idle state and also for cancelling the idle state. The group control unit 15 is configured to receive data from a control circuit external to the elevator system, which can be a control circuit 2*a* of at least the lighting of the building, an electronic control circuit 2*b* for door locking and/or a control circuit 2*c* for the access control of the building. The control circuit 2*a* for the lighting is disposed in the building in connection with the light switches, controlling the lights of the building, such as e.g. the stairway lights. The electronic control circuit 2*b* for door locking controls the locking of the outer doors; in addition to conventional keys, a smart electronic control circuit enables the opening of a door also with a key based on contactless identification, such as on infrared or RFID technology. The electronic circuit for locking can also identify and transmit data about with whose key a lock is opened. The control circuit 2*c* for the access control of the building can be connected to a user interface, such as to a keypad with which a door code is given; the control circuit for access control can also operate e.g. in connection with a doorbell or door camera in identifying a person trying to enter the building or moving in the building.

The aforementioned control circuits 2*a*, 2*b*, 2*c* external to the elevator system are connected to a building automation channel, and the building automation channel is further led, directly or e.g. via a gateway, to the group control unit 15. The group control unit 15 is connected to a building automation channel in a manner allowing data transfer with a transmitter-receiver circuit, via which the group control unit 15 receives data from control circuits 2*a*, 2*b*, 2*c* external to the elevator system. On the basis of the data received via the building automation channel, the group control unit 15 controls, depending on the situation, one or more elevators into an idle state and, if necessary, wakes up one or more elevators by cancelling their idle state. Controlling into an idle state/cancelling an idle state occurs by sending with the group control unit 15 an elevator-specific control command to the elevator control units 3 via the data channel between the group control unit 15 and the elevator control units 3. Therefore the elevator can be controlled into an idle state when the control circuit for lighting sends information that the lights in the stairway have been extinguished and the idle state can be cancelled and the elevator can be woken up when the control circuit for lighting informs that a light has been lit on some floor of the building. In a corresponding manner the elevator can also be woken up from an idle state when the group control unit 15 receives information from an electronic control circuit 2*b* for locking the door and/or from a control circuit 2*c* for the access control of the building that a person identified as an elevator passenger is arriving in the building. In this case the group control unit 15 can, in connection with waking up an elevator from an idle state, also allocate a destination call to one or more elevator control units 3, which destination call specifies the assumed destination floor of the passenger for the purpose of the elevator control.

Information about the lighting/extinguishing of the lights of the building can be determined also by measuring the voltage in the electricity supply cables of the lights, in which case a lack of voltage informs that the lights have been extinguished, whereas the appearance of voltage in the electricity supply cable(s) indicates switching on of the lights.

If the elevator system does not comprise a group control unit 15, e.g. owing to the small number of elevators, the elevator control unit/elevator control units 3 can be connected directly to a building automation channel such that data transfer between the elevator control unit/units 3 and control circuits 2*a*, 2*b*, 2*c* external to the elevator system is possible in the same manner as when using a group control unit 15. In this case each elevator control unit 3 also comprises a control 1*a* for controlling the elevator into an idle state and/or for cancelling the idle state on the basis of data received via a building automation channel from a control circuit 2*a*, 2*b*, 2*c* external to the elevator system. The aforementioned control 1*a* can in this case be included in the software and/or in control logic of the elevator control unit.

In the first embodiment of the invention the elevator is switched in an idle state to an energy-saving mode by disconnecting the electricity supply of one or more control devices 14*a*, 14*b*, 14*c*, 14*d* of the elevator. For this reason a controllable switch is disposed in the electricity supply circuit of the control devices 14*a*, 14*b*, 14*c*, 14*d* in question, which controllable switch can be e.g. a relay or contactor or, on the other hand, also a solid-state switch, such as a MOSFET transistor, an IGBT transistor, a thyristor, a semiconductor relay and/or a bipolar transistor. The switch is controlled with the control 1b of the group control unit 15 and/or with the control 1a of an elevator control unit 3 such that by controlling the switch the electricity supply of the control devices 14a, 14b, 14c, 14d in question is disconnected for the duration of an idle state, in which case the energy consumption of the elevator system decreases.

In the second embodiment of the invention the elevator car is driven to a predefined point in the elevator hoistway during an idle state of the elevator. One possibility is to drive the elevator car for the duration of an idle state to a point from which it is as convenient as possible for a person arriving in the building to transfer to the elevator car. The elevator car can also be driven for the duration of an idle state to a point that is particularly favorable during exceptionally strong swaying of the building, such as e.g. during a strong wind or earthquake. When waking up an elevator from an idle state, the elevator control unit 3 starts a run sequence for cancelling the idle state by transferring the elevator car from the place in which the elevator car is located during an idle state of the elevator car to the entrance at which it is assumed, on the basis of the information received from a control circuit 2a, 2b, 2c external to the elevator system, that the passenger will arrive.

Embodiment 3

Figure 2:
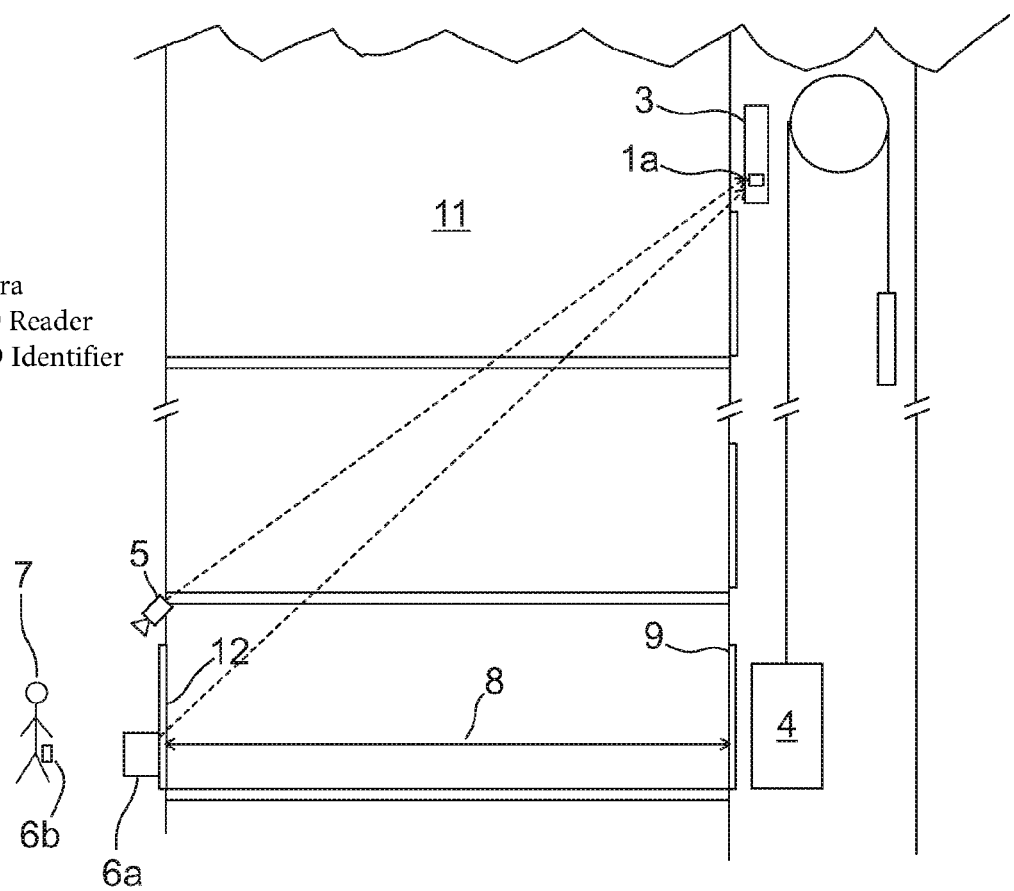
FIG. 2 illustrates an elevator system according to a third embodiment of the invention

In the elevator system presented in FIG. 2, means 5, 6 for detecting an elevator passenger are fitted into connection with the elevator system. An elevator passenger can be identified e.g. by processing an image signal received with a camera 5 using an image recognition program. An elevator passenger can be identified also with e.g. an RFID reader 6a, which is disposed beside the path of movement of an elevator passenger 7 arriving in the building 11, e.g. in connection with the entrance 12 of the building or inside the building 11 such that the RFID reader can detect the RFID identifier 6b to be carried along with an elevator passenger 7. The identity of an elevator passenger is detected by taking an RFID identifier 6b into the proximity of a reader 6a, in which case a wireless data transfer connection forms between the reader 6a and the identifier 6b via electromagnetic radiation.

The aforementioned camera 5/RFID reader 6a is disposed such that an elevator passenger 7 can be detected at a defined distance s (reference number 8 in FIG. 2) from the entrance 9 of an elevator car that is in the building 11. The distance s is determined such that at least the same amount of time t is spent on the transfer of a passenger 7 the aforementioned amount of distance s at an average walking v speed as for the return of the elevator from an idle state to operational readiness, i.e. according to the following equation:

$$s \geq v * t$$

where s is the distance from the entrance 9 of the elevator car, v is the average walking speed of a passenger 7, and t is the time it takes to return the elevator from an idle state to operational readiness.

The camera 5/RFID reader 6a is connected via a communications channel to the elevator control unit 3, which is disposed in the elevator hoistway. Also the hoisting machine moving the elevator car 4 as well as the frequency converter supplying power to the hoisting machine are disposed in the elevator hoistway. The communications channel between the camera 5/RFID reader 6a can be implemented e.g. with signal wires or with a wireless data transfer connection.

The elevator control unit 3 comprises a control 1a for controlling the elevator into an idle state and for cancelling the idle state. In this embodiment of the invention the elevator is switched into an energy-saving mode during the idle state. The elevator control unit 3 controls the elevator into an energy-saving mode when at least the defined amount of time delay has passed since the last received elevator call. During an energy-saving mode the elevator control unit disconnects the electricity supply to one or more control devices of the elevator.

When it receives information from the camera 5/RFID reader 6a about the arrival of an elevator passenger, the elevator control unit 3 cancels the energy-saving mode and wakes up the elevator. In this case the elevator control unit 3 again starts the electricity supply to the control devices of the elevator that are in an energy-saving mode, in which case when the electricity supply is connected the control devices start up again. The time delay for starting up is approx. 5 seconds. The camera 5/RFID reader 6a is fitted to detect an elevator passenger 7 at such a distance 8 from the entrance 9 of the elevator car that it takes the elevator passenger 7 a time of 5 seconds at an average walking speed to arrive at the entrance of the elevator car, so that the elevator has recovered from the 5-second start-up delay and is operationally ready when the elevator passenger 7 arrives.

The invention is described above by the aid of a few examples of its embodiment. It is obvious to the person skilled in the art that the invention is not limited only to the embodiments described above, but that many other applications are possible within the scope of the inventive concept defined by the claims.

The invention claimed is:

1. An elevator system, comprising:
   an elevator control unit for controlling the movement of an elevator car in an elevator hoistway,
   wherein the elevator control unit is configured to receive data from a control circuit external to the elevator system, and the elevator control unit is arranged to start a new run sequence for cancelling an idle state of the elevator by transferring the elevator car from its current location during the idle state to that entrance at which it is assumed, on the basis of the information received from the control circuit external to the elevator system, that a passenger will arrive,
   wherein the elevator is controlled into an energy-saving mode during the idle state,
   wherein the elevator car is driven to a predefined point in the elevator hoistway during the idle state of the elevator, and
   wherein the electricity supply of one or more devices of the elevator system is arranged to be disconnected for the duration of the energy-saving mode.

2. The elevator system according to claim 1, wherein the control circuit external to the elevator system is a control circuit for the lighting of the building.

3. The elevator system according to claim 1, wherein the control circuit external to the elevator system is a control circuit for door locking.

4. The elevator system according to claim 3, wherein the control circuit external to the elevator system is an access control circuit of a building.

* * * * *